United States Patent [19]
Akiyama et al.

[11] Patent Number: 5,142,373
[45] Date of Patent: Aug. 25, 1992

[54] REAR PROJECTION TELEVISION SET HAVING IMPROVED CONTRAST

[75] Inventors: Kazuya Akiyama; Masaru Nozawa, both of Tokyo, Japan

[73] Assignee: Pioneer Electronic Corporastion, Tokyo, Japan

[21] Appl. No.: 622,683

[22] Filed: Dec. 5, 1990

[30] Foreign Application Priority Data

Apr. 25, 1990 [JP] Japan .................. 2-107522

[51] Int. Cl.⁵ .............................. H04N 5/74
[52] U.S. Cl. .................... 358/231; 358/60; 358/237
[58] Field of Search ............ 358/231, 60, 61, 232, 358/89, 88, 237

[56] References Cited

U.S. PATENT DOCUMENTS

| | | | |
|---|---|---|---|
| 4,544,946 | 10/1985 | VanBreemen | 358/231 |
| 4,556,913 | 12/1985 | VanBreeman et al. | 358/237 |
| 4,578,710 | 3/1986 | Hasegawa | 358/231 |
| 4,621,293 | 11/1986 | Matis | 358/231 |
| 4,707,746 | 11/1987 | Nishikawa | 358/231 |

*Primary Examiner*—James J. Groody
*Assistant Examiner*—Glenton B. Burgess
*Attorney, Agent, or Firm*—Sughrue, Mion, Zinn Macpeak & Seas

[57] ABSTRACT

A rear projection television set is of the construction in which an image light projected from a projection cathode ray tube is reflected by a mirror onto the rear surface of a screen comprising a Fresnel lens and the light passes through the front surface of the screen to be viewed by viewers. The condensing distance of the Fresnel lens is selected to be less than four meters for radii of up to 300(S/40) millimeters of the Fresnel lens when the mirror is positioned relative to the screen such that $A \leq 200 + (S-40) \times 10$ millimeters, where S is the diagonal distance of the screen in inches and A is the shortest distance between the mirror and the screen.

3 Claims, 9 Drawing Sheets

DISTANCE FROM CENTER OF SCREEN (mm)

DISTANCE FROM CENTER OF SCREEN (mm)

DISTANCE FROM CENTER OF SCREEN (mm)

DISTANCE FROM CENTER OF SCREEN (mm)

DISTANCE FROM CENTER OF SCREEN (mm)

DISTANCE FROM CENTER OF SCREEN (mm)

FIG. 17

| EMBODIMENTS (COMPARISONS) | $S_{(in.)}$ | $A_{(mm)}$ | CONDENSING DISTANCE | $\theta_{2(deg)}$ | DISTANCE OF Q BELOW CENTER O | UNDESIRE LIGHT EMITTED ABOVE CENTER OF SCREEN (mm) |
|---|---|---|---|---|---|---|
| 1 | 40 | 100 | 3 | 43.4 | 101 | 272 |
| (1) | 40 | 100 | 10 | 19.2 | 149 | 282 |
| 2 | 40 | 150 | 4 | 41.0 | 107 | 240 |
| (2) | 40 | 150 | 10 | 26.6 | 141 | 250 |
| 3 | 40 | 200 | 4 | 48.1 | 97 | 194 |
| (3) | 40 | 200 | 10 | 31.7 | 129 | 202 |

REAR PROJECTION TELEVISION SET HAVING IMPROVED CONTRAST

BACKGROUND OF THE INVENTION

1. Field of the Invention

The present invention relates to a rear projection television set having a projection cathode ray tube, mirrors which reflects the light from the tube onto a screen, and a screen that receives the light reflected by the mirror and passes it therethrough, and which the image projected on the screen is viewed from the other side of the screen.

2. Prior Art

FIG. 7 shows a prior art rear projection television set of this type. A projector lens 3 is located in front of the frame of the projection cathode ray tube 2 housed in a cabinet 1. The light projected from the tube 2 is condensed by the projector lens 3, reflected by mirrors 4 and 5, and then received by a screen 6. The screen 6 is generally of the construction in which a Fresnel lens is superposed to a lenticular sheet formed of a plurality of cylindrical lenses which extend vertically and are disposed with narrow spaces therebetween. The light is reflected by the mirror 5 onto the Fresnel lens and passes through the lenticular sheet opposite the viewers.

The light emitted from the screen includes two kinds of lights; one is directly viewed as an image by the viewer and the other is an undesired light Lu that has adverse effects on the picture quality. The unwanted light Lu is emitted downwards at an angle of $\Theta_1$ with respect to a line normal to the screen as shown in FIG. 9.

As shown in FIG. 8, a major portion Ld of the light incident upon the Fresnel lens 7 passes through the screen into the viewer's eyes as a desired image. A minor portion of the incident light is reflected by the lens surface (left side in FIG. 8) of Fresnel lens 7. The rest (not shown) is reflected by the back surface (right side in FIG. 8) of Fresnel lens. Further, the light reflected by the lens-surface is again reflected by the back surface of Fresnel lens. The term undesired light is used to refer to the light Lu reflected by the lens surface of the Fresnel lens. Part of the undesired light Lu is reflected by the mirror 5 and then reaches the Fresnel lens. The light Lu is emitted from the Fresnel lens with a downward refraction angle of $\Theta_1$. This angle is small when the distance A between the Fresnel lens and the mirror 5 is large as shown in FIG. 9. It should be noted that the undesired light Lu is emitted over an area H on the screen which is approximately below a center line C. Thus, when the screen is approximately as high as viewer's eyes, the undesired light will not go into the viewer's eyes and therefore the contrast of the screen 6 is unaffected. Conventional rear projection television sets have a large depth D as shown in FIG. 7, that is, the distance A between the Fresnel lens 7 and mirror 5 is relatively long. Thus, the undesired light emitted from the screen will not reach the viewer's eyes even if the angle $\Theta_1$ is small. In recent years, the trend is that a short depth of the cabinet is required of the rear projection television sets. Shorter the depth of the cabinet is, the shorter the distance A between the Fresnel lens 7 and mirror 5 becomes. As shown in FIG. 10, as the distance A becomes shorter, the undesired light contains more amount of light reflected by the mirror 5 onto the Fresnel lens 7. The conventional Fresnel lenses have long condensing distances in the range of 8-10 meters and therefore the light through the Fresnel lens 7 has a small exit angle $\Theta_1$, thus deteriorating the contrast of the screen 6. This undesired light is emitted from almost the entire surface H of the screen. Increasing screen gain (brightness) prevents the deterioration of screen contrast but causes narrower viewing angles.

SUMMARY OF THE INVENTION

An object of the present invention is to provide a rear projection television set in which the undesired light will not go into the viewer's eyes when the distance between the screen and the mirror nearest to the screen in the light path is made shorter. Another object of the invention is to provide a thin-type rear projection television set in which the contrast of screen is improved without having to narrow the viewing angle.

A rear projection television set according to the present invention is of the construction in which the image lights projected by projection cathode ray tubes are reflected by a mirror onto the rear surface of a screen including a Fresnel lens and then the light through is emitted from the front surface of the screen so that the light is viewed by the viewrs from the front side of the screen. The light-condensing distance of the Fresnel lens is selected to be less than four meters for radii of up to 300(S/40) millimeters with respect to the center of the screen if $A \leqq 200+(S-40)$ in millimeters, where S is the diagonal distance of the screen in inches and A is the shortest distance between the mirror and screen.

BRIEF DESCRIPTION OF THE DRAWINGS

Features and other objects of the invention will be more apparent from the description of preferred embodiments with reference to the accompanying drawings in which:

FIG. 17 is a table showing data of the respective embodiments and their comparison examples.

DESCRIPTION OF PREFERRED EMBODIMENTS

Embodiments of the present invention and comparison examples will now be described with reference to FIGS. 1-6 and FIGS. 11-17.

First Embodiment

Figure 1:
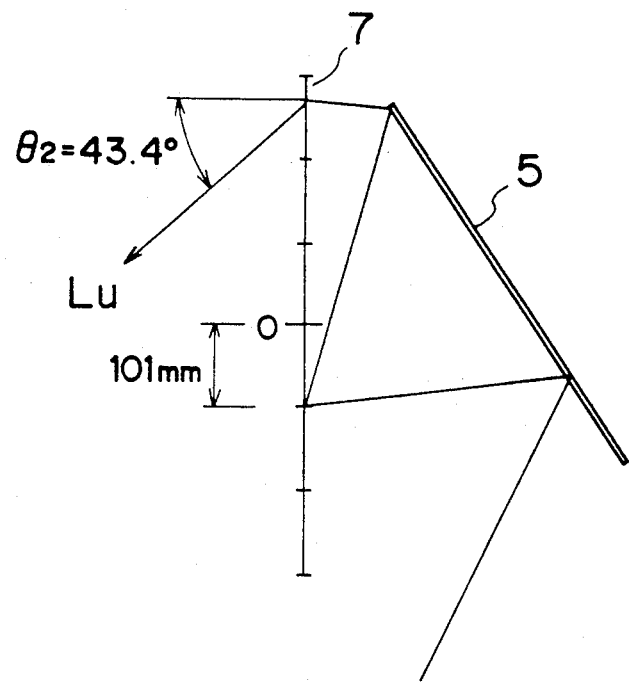
FIG. 1 is an illustrative diagram showing the path of undesired light Lu in a first embodiment of the present invention and its exit angle $\Theta_2$.
Figure 2:
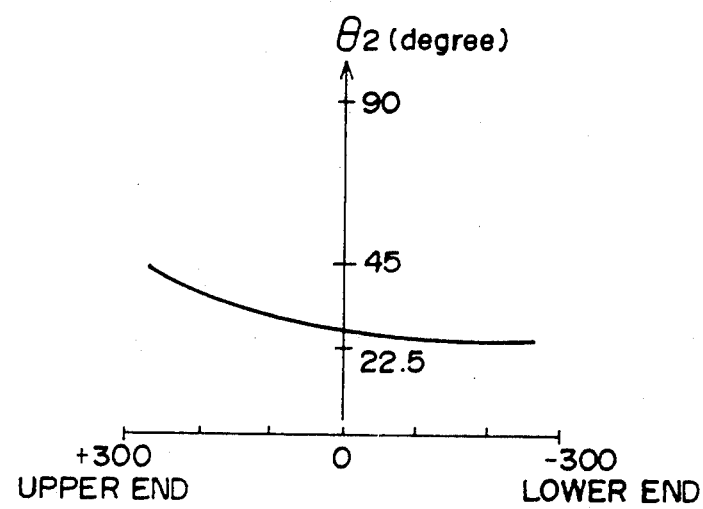
FIG. 2 shows the exit angles $\Theta_2$ of the undesired light Lu in FIG. 1 plotted against vertical distances on a screen.

A first embodiment of the present invention will be described referring to FIGS. 1 and 2. The first embodiment applies to a rear projection television set in which the screen size thereof is 40 inches (vertically about 600 mm and horizontally about 800 mm) and the distance A between a Fresnel lens 7 and a mirror 5 is such that $A \leq 200 + (S-40) \times 10$ where S is the diagonal distance of the screen in inches and A is the shortest distance between the mirror and the screen in millimeters. In the first embodiment, A is 100 mm.

The Fresnel lens 7 is designed to have a condensing distance of three meters for radii of up to 300(S/40) mm with respect to the center of the lens 7 which is located at the center of the screen. The Fresnel lens is superposed to a lenticular sheet formed of a plurality of cylindrical lenses which extend vertically and are disposed with narrow spaces therebetween. FIG. 1 shows the exit angle of the undesired light in the embodiment. The undesired light of a maximum exit angle results from the light which is reflected by the screen at a point Q, 101 mm below the center O of the Fresnel lens 7 and is then reflected back by the top end of mirror 5. The maximum exit angle of undesired light $\Theta_2$ is 43.4 degrees and exits the top end of the screen. FIG. 2 shows a curve in which the exit angles $\Theta_2$ of the undesired light Lu are plotted against vertical distances on the screen. The undesired light having the minimum exit angle of about 23 degrees exits the screen at its bottom end. Thus, the screen will not loose the required contrast since no undesired light will reach the viewer's eyes when viewing the screen at a point about three meters away from the screen front.

The effects of the present invention were evaluated by changing the condensing distance of the Fresnel lens 7 and the distance A between the mirror 5 and Fresnel lens 7 as follows:

Comparison 1

Figure 11:
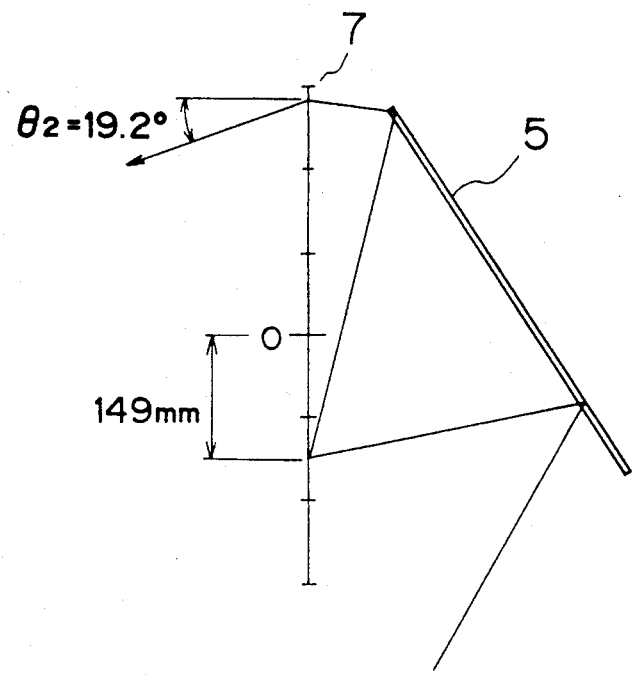
FIGS. 11, 13, and 15 are illustrative diagrams illustrating the undesired light in a rear projection television set when the conventional Fresnel lens is used in the first, second, and third embodiments, respectively.
Figure 12:
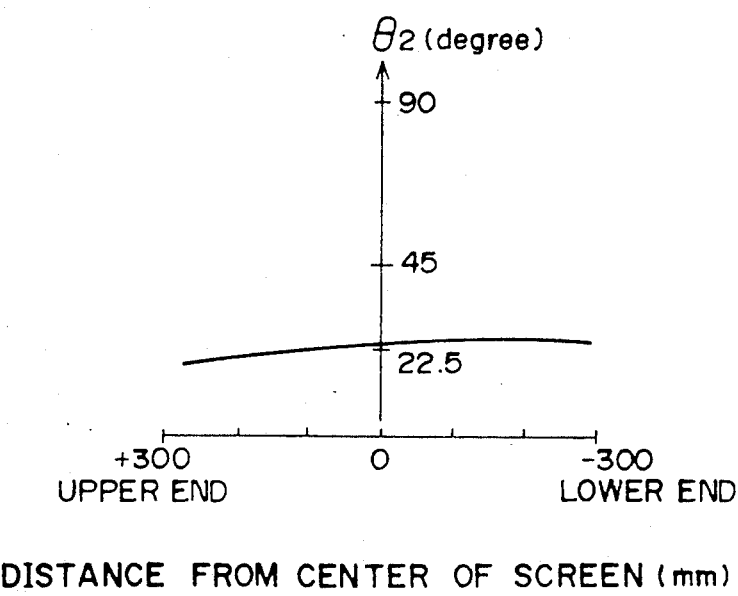
FIGS. 12, 14, and 16 shows the exit angles $\Theta_2$ of the undesired light Lu plotted against vertical distances on the screen for FIGS. 11, 13, and 15, respectively.

The comparison 1 is to compare with the first embodiment. FIGS. 11 and 12 show the undesired light when a Fresnel lens having a condensing distance of 10 meters is used in place of the Fresnel lens in the first embodiment. The light reflected by the Fresnel lens at the point Q, 149 mm below the center of the screen, is reflected back by the top end of the mirror 5, and then exits the screen at an exit angle of $\Theta_2 = 19.2$ degrees. Thus, the contrast is deteriorated when viewing at a point about three meters away from or closer to the screen.

Second Embodiment

Figure 3:
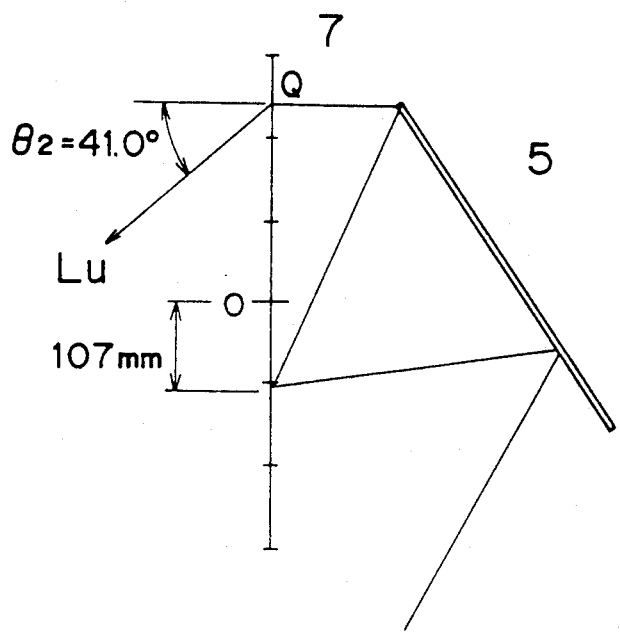
FIG. 3 is an illustrative diagram illustrating the path of undesired light Lu in a second embodiment of the present invention and the exit angle $\Theta_2$ of the undesired light.
Figure 4:
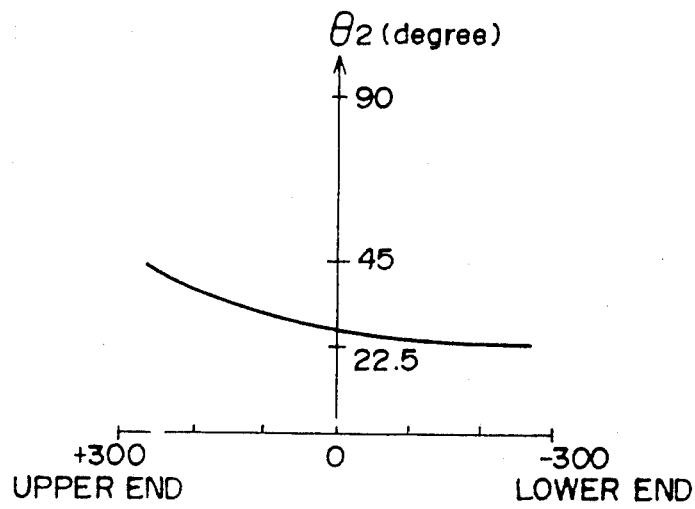
FIG. 4 shows the exit angles $\Theta_2$ of the undesired light Lu in FIG. 3 plotted against vertical distances on the screen.

FIGS. 3 and 4 show a second embodiment which differs from the first embodiment in that the distance between the mirror 5 and Fresnel lens 7 is 150 mm and the condensing distance of the Fresnel lens 7 is four meters. The undesired light of a maximum exit angle results from the light reflected by the screen at a point Q, 107 mm below the center O of the Fresnel lens 7, and then reflected back by the top end of mirror 5. The undesired light of the maximum exit angle of $\Theta_2 = 41.0$ degrees exits the screen. Thus, the contrast of screen will not be deteriorated since no undesired light will reach the viewer's eyes when viewing the screen at a point about three meters away from the screen front.

Comparison 2

Figure 13:
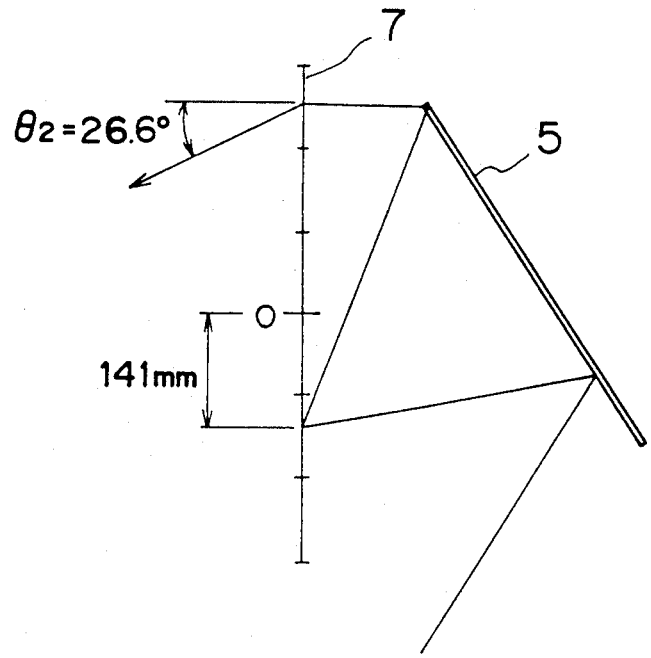
Figure 14:
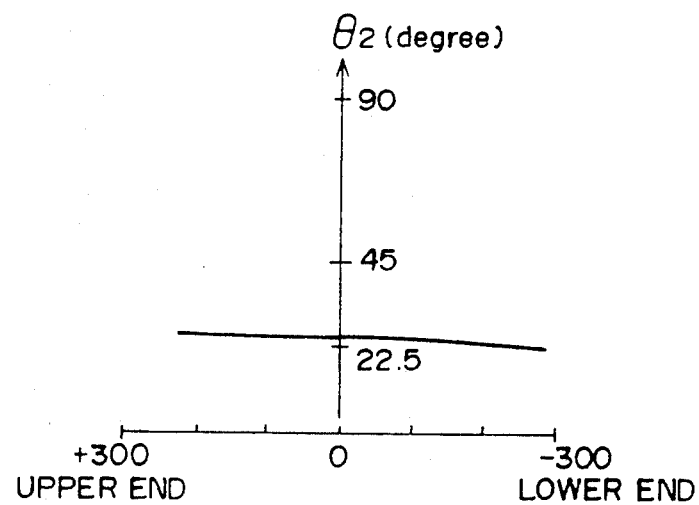

The comparison 2 is to compare with the second embodiment. FIGS. 13 and 14 show the undesired light when a Fresnel lens having a condensing distance of 10 meters is used in place of the Fresnel lens in the second embodiment and the distance between the mirror 5 and Fresnel lens 7 is 150 mm. The light reflected by the Fresnel lens 7 at the point Q, 107 mm below the center of the screen, is reflected back by the top end of the mirror 5, and then exits the screen at an exit angle of $\Theta_2 = 26.6$ degrees. Thus, the contrast has been improved to some extent as compared to the comparison 1 but not adequate yet.

Third Embodiment

Figure 5:
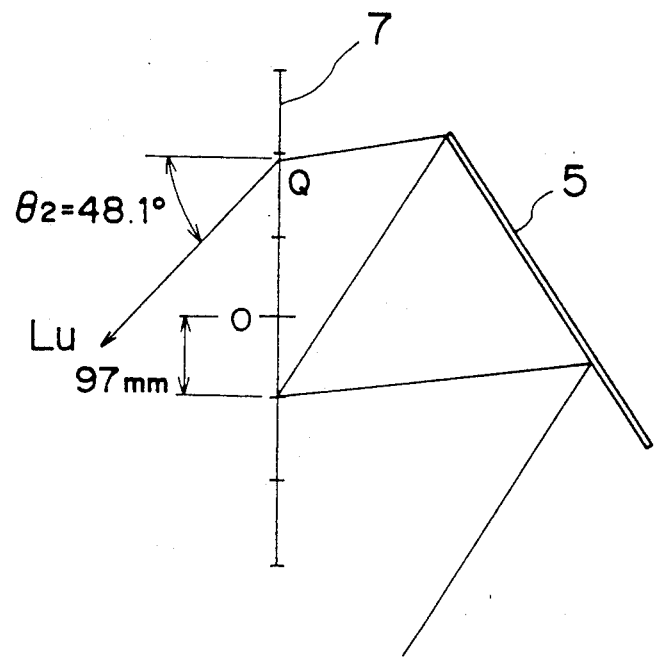
FIG. 5 is an illustrative diagram illustrating the path of undesired light in a third embodiment of the present invention and the exit angle $\Theta_2$ of the undesired light Lu.
Figure 6:
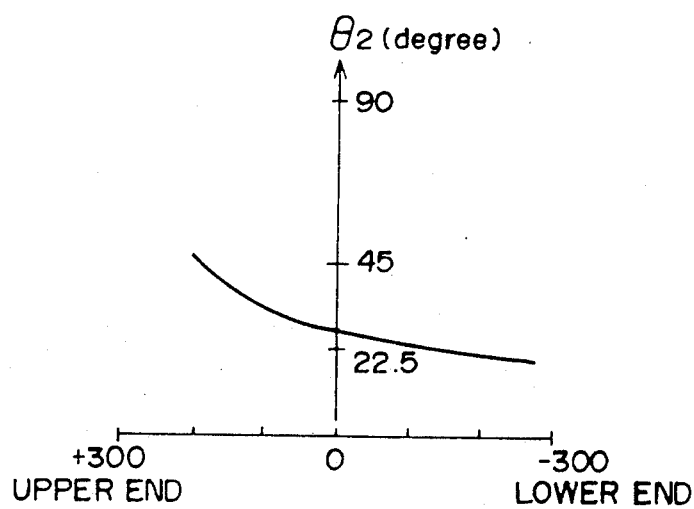
FIG. 6 shows the exit angles $\Theta_2$ of the undesired light Lu in FIG. 5 plotted against vertical distances on the screen.
Figure 7:
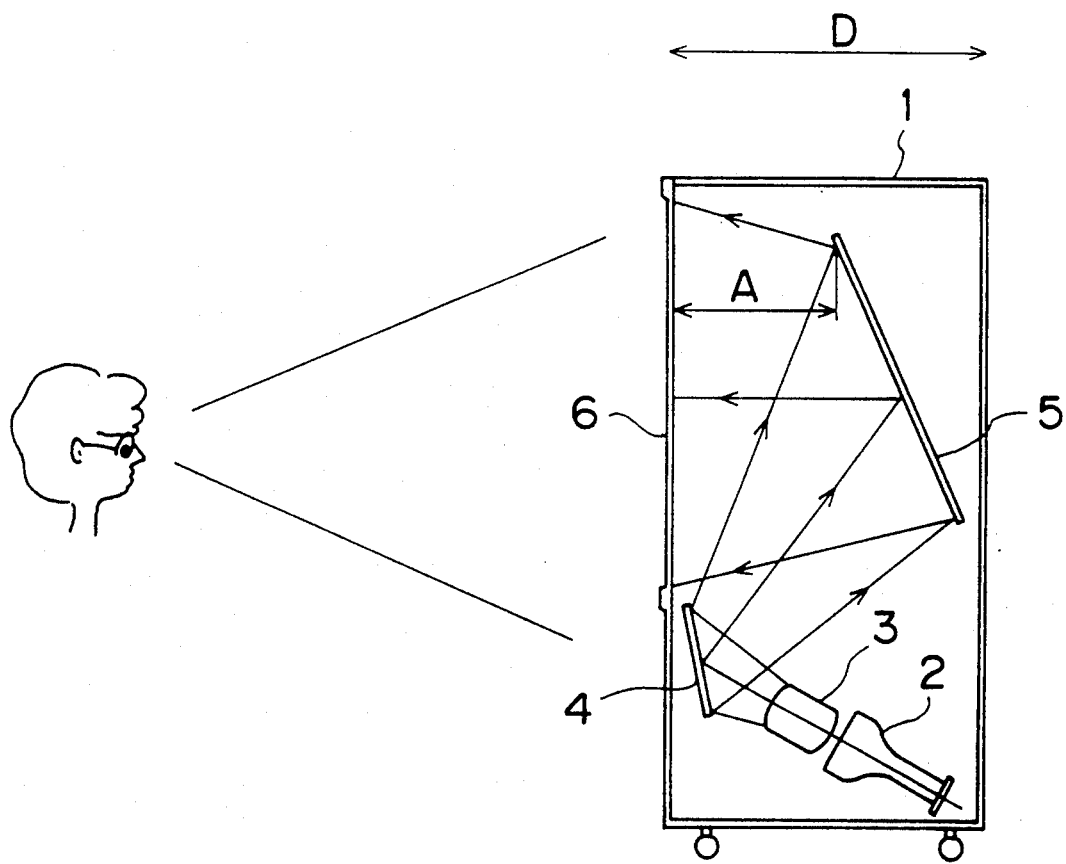
FIG. 7 is a cross-sectional side view of a rear projection television set.
Figure 8:
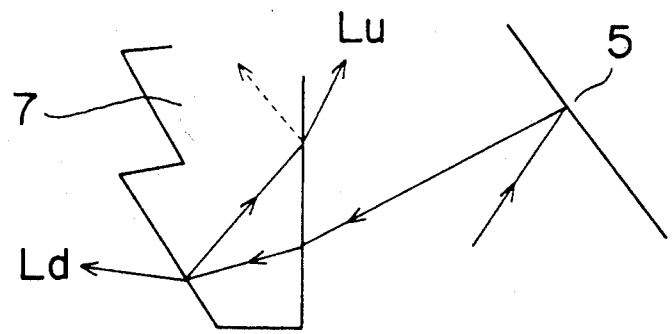
FIG. 8 is an illustrative diagram illustrating how the undesired light Lu is reflected by the Fresnel lens.
Figure 9:
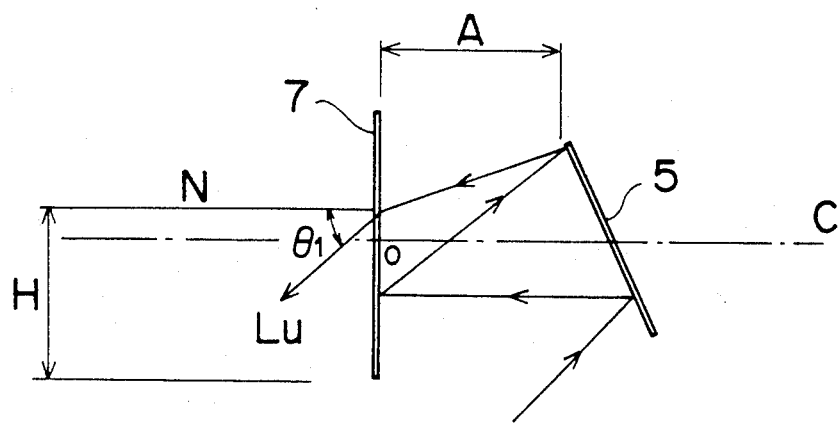
FIG. 9 is a diagram showing the undesired light when the distance A between the Fresnel lens and mirror is long.
Figure 10:
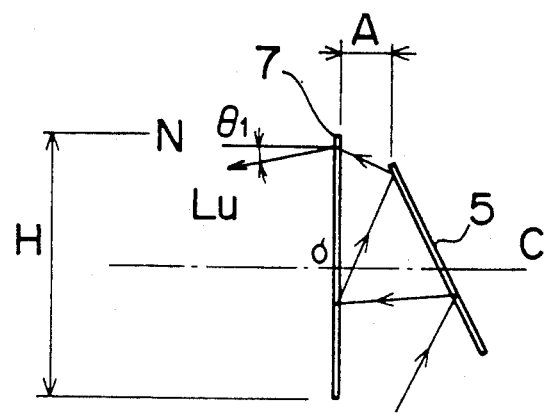
FIG. 10 is a diagram showing the undesired light Lu when the distance A between the Fresnel lens and mirror is short.

FIGS. 5 and 6 show a third embodiment in which the condensing distance of the Fresnel lens 7 is four meters. The third embodiment differs from the first embodiment in that the distance A between the mirror 5 and Fresnel lens 7 is 200 mm. The undesired light of maximum exit angle results from the light which is reflected by the screen at a point Q, 97 mm below the center O of the Fresnel lens 7, and is then reflected back by the top end of mirror 5. The undesired light of the maximum exit angle of $\Theta_2 = 48.1$ degrees exits the screen at a point 194 mm below the center of screen. Thus, the contrast of screen will not be deteriorated since no undesired light will reach the viewer's eyes when viewing the screen at a point about three meters away from the screen front.

Comparison 3

Figure 15:
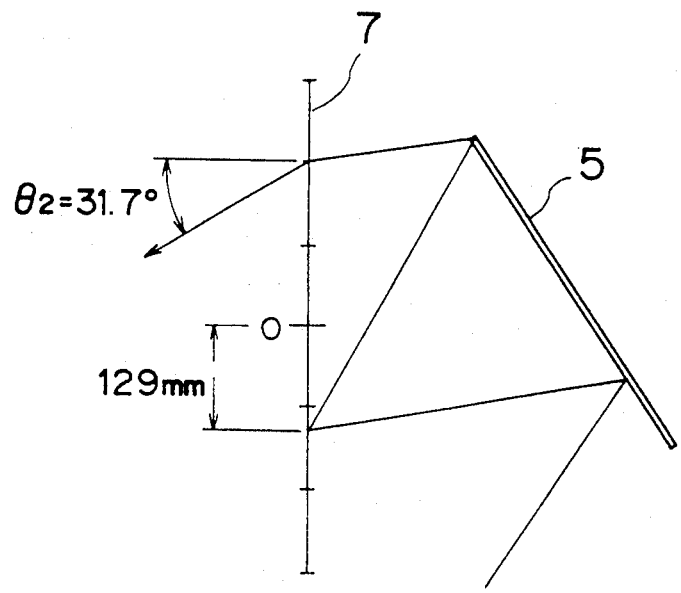
Figure 16:
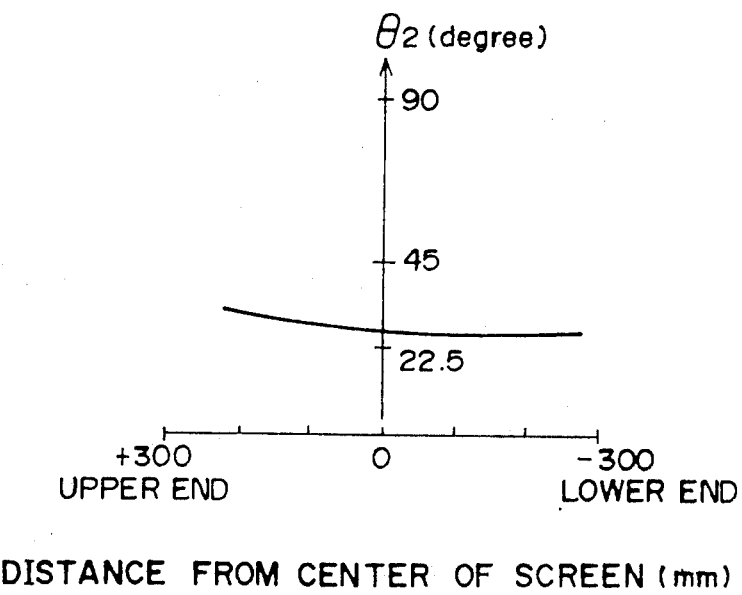

The comparison 3 is to compare with the third embodiment. FIGS. 15 and 16 show the undesired light when a Fresnel lens having a condensing distance of 10 meters is used in place of the Fresnel lens in the third embodiment and the distance between the mirror 5 and Fresnel lens 7 is 200 millimeters. The light reflected by the Fresnel lens 7 at the point Q, 129 mm below the center of the screen, is reflected back by the top end of the mirror 5, and then exits the screen at a point 202 mm above the center of the screen at an exit angle of $\Theta_2 = 31.7$ degrees. Thus, the contrast has been improved to some extent as compared to the comparison 2 but not adequate yet.

As is apparent from the above described embodiments and comparison examples, the shorter the distance A between the mirror 5 and Fresnel lens 7 is, the more clearly the effects of the invention are exhibited.

What is claimed is:

1. A rear projection television comprising:
  a projector for projecting a light image;
  a mirror for reflecting the light image from said projector; and
  a screen including a Fresnel lens on a rear surface thereof positioned opposite to said mirror for receiving the light reflected from said mirror, said Fresnel lens having a condensing distance and a center located at a center of said screen, said screen passing the light image from said mirror through a front surface thereof so that the light through the front surface of said screen is viewed at a distance away from the front surface of the lens is selected to be less than four meters for radii of up to 300(S/40) millimeters of said Fresnel lens when said mirror is positioned relative to said screen such that $$A \leq 200 - (S - 40) \cdot 10$$

where S is the diagonal distance of said screen in inches and A is the shortest distance between said mirror and said screen expressed in millimeters.

2. A rear projection television according to claim 1, wherein said screen includes a lenticular sheet having cylindrical lenses extending vertically.

3. A rear projection television according to claim 1 wherein said projector includes cathode ray tubes.

* * * * *

UNITED STATES PATENT AND TRADEMARK OFFICE
CERTIFICATE OF CORRECTION

PATENT NO. : 5,142,373

DATED : August 25, 1992

INVENTOR(S) : Kazuya Akiyama et al.

It is certified that error appears in the above-identified patent and that said Letters Patent is hereby corrected as shown below:

Column 2, line 23, delete "viewrs", and insert --viewers--;

Column 5; line 7, after "surface", insert --of the screen; wherein said condensing distance--.

Signed and Sealed this

Thirtieth Day of November, 1993

Attest:

BRUCE LEHMAN

Attesting Officer

Commissioner of Patents and Trademarks